(12) United States Patent
Hall et al.

(10) Patent No.: US 10,151,623 B2
(45) Date of Patent: Dec. 11, 2018

(54) THIN WEIGHT SCALE

(71) Applicants: David R. Hall, Provo, UT (US); Jared Reynolds, Pleasant Grove, UT (US); Joshua Larsen, Spanish Fork, UT (US); Jared Wagner, Provo, UT (US); Dan Allen, Springville, UT (US); Nathan Hopkins, Springville, UT (US); Justin Robinson, Provo, UT (US); Kevin Cheatham, Provo, UT (US)

(72) Inventors: David R. Hall, Provo, UT (US); Jared Reynolds, Pleasant Grove, UT (US); Joshua Larsen, Spanish Fork, UT (US); Jared Wagner, Provo, UT (US); Dan Allen, Springville, UT (US); Nathan Hopkins, Springville, UT (US); Justin Robinson, Provo, UT (US); Kevin Cheatham, Provo, UT (US)

(73) Assignee: Hall Labs, LLC, Provo, UT (US)

( * ) Notice: Subject to any disclaimer, the term of this patent is extended or adjusted under 35 U.S.C. 154(b) by 179 days.

(21) Appl. No.: 15/222,267

(22) Filed: Jul. 28, 2016

(65) Prior Publication Data
US 2018/0031411 A1 Feb. 1, 2018

(51) Int. Cl.
*G01G 19/50* (2006.01)
*G01G 21/23* (2006.01)
*G01G 19/52* (2006.01)
*G01G 19/44* (2006.01)

(52) U.S. Cl.
CPC ............ *G01G 21/23* (2013.01); *G01G 19/44* (2013.01); *G01G 19/50* (2013.01); *G01G 19/52* (2013.01)

(58) Field of Classification Search
CPC .......... G01G 19/44; G01G 19/50; G01G 19/52
See application file for complete search history.

(56) References Cited

U.S. PATENT DOCUMENTS

| | | | | |
|---|---|---|---|---|
| 2,057,024 A * | 10/1936 | Gunnison | ............... | G01G 19/44 177/144 |
| 4,697,656 A * | 10/1987 | de Canecaude | ....... | G01G 19/44 177/144 |
| 4,800,973 A * | 1/1989 | Angel | ................... | G01G 3/1406 177/210 C |
| 4,993,506 A * | 2/1991 | Angel | ................... | G01G 3/1402 177/211 |
| 5,510,581 A * | 4/1996 | Angel | .................... | G01G 3/141 177/211 |
| 6,211,472 B1 * | 4/2001 | Schulze | ............... | G01G 21/244 177/154 |
| 7,134,715 B1 * | 11/2006 | Fristedt | .................. | B60N 2/002 297/180.12 |

(Continued)

*Primary Examiner* — Natalie Huls

(57) ABSTRACT

A thin scale apparatus for measuring body weight includes 5 or more force sensors within a total thickness of between 0.4 inches and 0.004 inches measured between a bottom surface and a top surface of the thin scale apparatus. The thin scale is designed to be thin enough to be non-intrusive or not recognized by a user. A weight of a toilet user may be determined as a combination of additive force of force sensors in a thin scale and force sensor associated with a toilet seat of a toilet. The force sensors may be positioned in one or more cavities on a bottom side of a substrate material of the thin scale or be embedded within a substrate material. Embodiments of a standalone thin scale and a thin scale with a toilet are disclosed.

18 Claims, 10 Drawing Sheets

(56) References Cited

U.S. PATENT DOCUMENTS

| | | | |
|---|---|---|---|
| 9,032,817 B2* | 5/2015 | Berme | G01L 5/161 |
| | | | 73/862.045 |
| 9,526,451 B1* | 12/2016 | Berme | A61B 5/486 |
| 9,546,898 B2* | 1/2017 | Kovacs | G01G 19/44 |
| 9,568,354 B2* | 2/2017 | Kovacs | G01G 19/44 |
| 9,595,185 B1* | 3/2017 | Hall | E03D 5/10 |
| 9,927,302 B1* | 3/2018 | Hall | G01J 5/041 |
| 2003/0079549 A1* | 5/2003 | Lokhorst | G01L 1/205 |
| | | | 73/754 |
| 2003/0084052 A1* | 5/2003 | Peterson | G06F 17/30958 |
| 2007/0022522 A1* | 2/2007 | Yu | A47K 13/24 |
| | | | 4/237 |
| 2008/0046291 A1* | 2/2008 | Huang | G06F 19/3418 |
| | | | 705/3 |
| 2008/0306399 A1* | 12/2008 | Kousaka | G01G 19/50 |
| | | | 600/547 |
| 2009/0183928 A1* | 7/2009 | Oseko | G01G 3/1402 |
| | | | 177/211 |
| 2010/0315373 A1* | 12/2010 | Steinhauser | G01L 1/205 |
| | | | 345/174 |
| 2011/0209927 A1* | 9/2011 | Honda | G01G 21/23 |
| | | | 177/225 |
| 2011/0226069 A1* | 9/2011 | Kim | G01L 1/2293 |
| | | | 73/862.045 |
| 2015/0000025 A1* | 1/2015 | Clements | G06F 3/013 |
| | | | 4/443 |
| 2016/0374619 A1* | 12/2016 | Borkholder | A61B 5/6891 |
| | | | 600/301 |
| 2017/0188960 A1* | 7/2017 | Banet | A61B 5/6892 |
| 2017/0199073 A1* | 7/2017 | Carreel | G01G 3/1402 |

* cited by examiner

THIN WEIGHT SCALE

TECHNICAL FIELD

This invention relates to weight scales for identifying user weight.

BACKGROUND

A scale is a common household item, especially in a bathroom, which users utilize to determine weight and other health information. One problem of using a scale in a bathroom is that most scales are bulky, and even those that aren't present safety hazards. Many users conceal scales in or beneath bathroom furniture or in corners of a bathroom in order to avoid tripping on their scales or hitting their scales with a bathroom door. Not only can this be inconvenient and hazardous, but for users with limited muscular use and/or mobility this can be difficult.

SUMMARY OF THE INVENTION

A body weight scale apparatus is disclosed herein that overcomes or improves upon the limitations discussed above. The scale includes five or more force sensors which enable a total scale thickness of between 0.4 inches and 0.004 inches.

An ultra-thin body weight scale with a thickness of between 0.4 and 0.004 enables scale placement in traffic areas without the worry of tripping on or stubbing a toe on the scale. The scale may be placed in areas where a user frequently sits or stands with disturbing the user or the user even noticing scale.

In one embodiment, a thin scale may be used as a standalone scale to measure the weight. In another embodiment the scale may be used in combination with a toilet to determine a full weight or partial weight of a toilet user. The scale apparatus includes at least 5 force sensors. The scale additionally has a total thickness of between 0.4 inches and 0.004 inches when measured from a top surface of the scale (where a user stands) to a bottom surface of the scale (the part which is adjacent to or touches the floor). A top surface of the scale may be formed by a plane defined by a top surface of bio-impedance electrodes attached to the scale. A user's feet may contact the top surface of the scale when the user stands on the scale.

A body weight scale including 5 or more force sensors is disclosed. Any number of force sensors greater than 5 may be used to obtain an accurate user weight. The number of force sensors required is dependent on the footprint size and rigidity of the scale. A scale apparatus may have 10, 20, 50 or more force sensors. The force sensor may be spaced nanometers to centimeters apart in an x-y plane. The number of force sensors may be determined based on a stiffness of the substrate and thickness of the substrate. For instance, a substrate material which will bottom out when force is applied will need to have additional force sensors. If a substrate material is very thin it will displace more under force than a less thin like material. The more a substrate is displaced the more force sensors are required to keep the substrate material from bottoming out. The less displacement of the substrate the fewer force sensors are required to maintain accurate weight measurements. The thin scale may be used as a standalone weight device or in combination with a toilet. As a standalone device the scale may have wireless communication capabilities, an embedded power source, and processing capabilities which allow it to communicate weight readings to a user device such as a computer or smart phone. The scale used in combination with a toilet may electrically connect to a toilet through a wired connection or by contacts and use a processor and power supply in the toilet to process sensor outputs of the scale. A weight of a toilet user may be determined as a combination of additive force of force sensors in a thin scale and force sensors associated with a toilet seat of a toilet. The thin scale force sensors may be positioned in one or more cavities on a bottom side of a rigid or semi-ridged material of the thin scale. The substrate material may be a metal alloy, fiber glass, plastic, printed circuit material or any other known materials capable of receiving force sensors and one or more feet of a user. The scale may be designed to be water proof allowing a floor to be moped without moving or noticing the scale. The scale may be constructed without a display and resemble a floor tile. Silicone, rubber, plastic, epoxy, and/or encasement techniques may be use to seal or water proof the scale.

A thin scale apparatus for measuring body weight includes 5 or more force sensors within a total thickness of between 0.4 inches and 0.004 inches measured between a bottom surface and a top surface of the thin scale apparatus. The thin scale is designed to be thin enough to be non-intrusive or not recognized by a user. A weight of a toilet user may be determined as a combination of additive force of force sensors in a thin scale and force sensor associated with a toilet seat of a toilet. The force sensors may be positioned in one or more cavities on a bottom side of a substrate material of the thin scale or be embedded within a substrate material. Embodiments of a standalone thin scale and a thin scale with a toilet are disclosed.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

Figure 1:
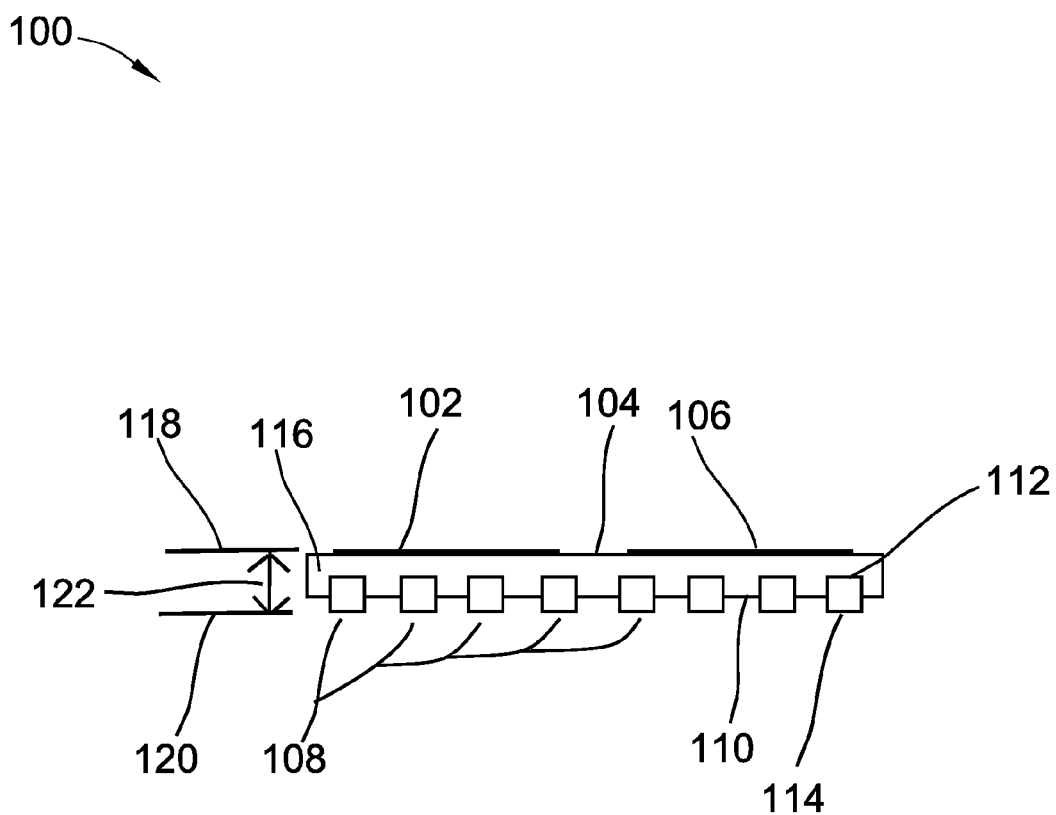
FIG. 1 depicts a side view of a scale apparatus showing a thickness of the scale in accordance with an embodiment of the invention.

A detailed description of the claimed invention is provided below by example, with reference to embodiments in the appended Figures. Those of skill in the art will recognize that the components of the invention as described by example in the Figures below could be arranged and designed in a wide variety of different configurations. Thus, the detailed description of the embodiments in the Figures is merely representative of embodiments of the invention, and is not intended to limit the scope of the invention as claimed.

In some instances, features represented by numerical values, such as dimensions, mass, quantities, and other properties that can be represented numerically, are stated as approximations. Unless otherwise stated, an approximate value means "correct to within 50% of the stated value." Thus, a length of approximately 1 inch should be read "1 inch+/−0.5 inch."

All or part of the present invention may be embodied as a system, method, and/or computer program product. The computer program product may include a computer readable storage medium (or media) having computer readable program instructions thereon for causing a processor to carry out aspects of the present invention. For example, the computer program product may include firmware programmed on a microcontroller.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a chemical memory storage device, a quantum state storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming languages such as Smalltalk, C++ or the like, and conventional procedural programming languages such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

FIG. 1 depicts a thin scale apparatus 100 with a total thickness 122. Thickness 122 represents a thickness measured between planes 118 and 120. A first plane 118 may be defined by top surfaces 102, 106 of bio-impedance electrodes 102 and 106 or a plane which is defined by an upper most feature or highest surface of the thin scale apparatus 100 which is substantially parallel to a second plane formed by a lowest surface of the thin scale apparatus contacting the floor or ground. The bio-impedance electrodes may be thin sheets, patches, or strips of conductive metal, conductive spray paint, or electrically conductive silicon. A second plane 120 is defined by the lower most features of the scale apparatus which rest on the floor. Plane 120 may be defined by a bottom portion 114 of two or more force cells 108 or by a lowest portion of a substrate material, if the force sensors are embedded within the substrate. Bottom portion 114 may rest upon a ground or floor and a user may stand on top of bio-impedance electrodes 102 and 106. In some embodiments force sensors may protrude from a substrate and form a lowest surface of the thin scale apparatus, in other embodiments force sensors may be embedded within substrate material 116 and a bottom portion of the substrate material may form the lowest surface of the thin scale apparatus and rest on a floor or ground level. An entirety of the five or more force sensors may be located between the first plane 118 and the second plane 120. Additionally, a processor, memory, a transceiver, battery, antenna, induction coil, heating element, temperature sensors and/or display may be located between the first plane 118 and the second plane 120. Alternatively, any combination of a processor, memory, a wired or wireless transceiver, battery, antenna, induction coil, heating element, temperature sensors and/or display may be located in a toilet and/or in the thin scale apparatus. A toilet may be connected to the thin scale apparatus by a cord, wire, contacts, or wireless transceiver and provide power to and communicate data with the thin scale apparatus. When a user's weight is placed upon electrodes 102 and/or 106, forces cells 108 compress, bend, stretch, or contort in some fashion giving an electrical representation of a force or strain placed on each of the force sensors. The force of each force sensor is then added to determine a total force or weight of a user standing on the scale apparatus. Thin scale apparatus 100 includes more than 5 forces sensors 108. In one embodiment scale apparatus 100 includes extensions that wrap around a base of toilet 102 (shown in FIGS. 6 and 7). In some embodiments, scale 100 includes 5 or more force sensors 108. In the FIG. 1, scale apparatus 100 includes 8 force sensors 108. In yet other embodiments, scale 100 may include more than 50 force sensors 108. However, in all embodiments of the invention, scale 100 includes at least 5 force sensors 108 to enable thinness of scale apparatus 100. A number of 5 or more force sensors 108 allows a thinner scale while still maintaining accurate readings. The number of force sensors may be determined based on a stiffness of the substrate and thickness of the substrate. For instance, a substrate material which will bottom out when force is applied will need to have additional force sensors. If a substrate material is very thin it will displace more under force than a less thin like material. The more a substrate is displaced the more force sensors are required to keep the substrate material from bottoming out. The less displacement of the substrate the fewer force sensors are required to maintain accurate weight measurements.

Force sensors 108 may include any of a variety of strain gauges, e.g. resistive, capacitive, inductive, etc. Resistive strain gauges being among the most common, which may be used with a Wheatstone bridge to detect changing applied force. For example, in some embodiments, force sensors 108 are metal foil strain gauges, being a type of resistive strain gauge, attached to a bottom surface of scale 100. The foil strain gauges are sensitive along an axial direction and/or a longitudinal direction. In some other embodiments, force sensors 108 are surface mount strain gauges. In yet other embodiments, force sensors 108 are printed circuit strain gauges. Printed circuit strain gauges are strain gauges made by printing metal on printed circuit boards (PCB) or other thin substrate material 116 such as a printed circuit substrate which functions as a strain gauge and a circuit, in order to determine loads applied to the substrate. Force sensors or strain gages may be printed on any type of material, plastic, glass, other metal objects, etc. In some embodiments, scale 100 is a metal sheet 116 with force sensors 108 inserted into cavities on a bottom side of the metal sheet. Force sensors may also be electrically connected by a wires to a printed circuit substrate. Other strain gauges include micro-wire, nano-wire strain gauges, force sensors, and multi-layer strain devices.

Capacitive strain gauges make use of a change in capacitance to determine an applied load. When a load is applied to a capacitive strain gauge, its capacitance increases or decreases, which leads to phase, frequency, voltage, and/or reactive differences. In some embodiments, for example, force sensors 108 may be frequency sensitive capacitive strain gauges, being a type of capacitive strain gauge.

Inductive strain gauges make use of a change in inductance, reactance, or inductive reactance to determine an applied load. i.e., as a load is applied to an inductive strain gauge, its inductance increases or decreases, causing detectable current, voltage, phase, resistive, reactive, and/or frequency differences.

To measure small changes in resistance, and compensate for temperature sensitivity, strain gauges are almost always used in a bridge configuration, such as a Wheatstone bridge, with a voltage or current excitation source.

Though not shown, in some embodiments, scale 100 includes heating coils which warm a top surface of scale 100 for the comfort of a user. For example, in one embodiment, scale 100 is positioned on a tiled floor which is cold to the touch of a user's feet. The user step on scale 100 and his/her feet are warmed by a top surface of scale 100. A heater may be used to calibrate the scale by heating the scale to a constant temperature and zeroing the scale without weight on the scale. The scale may also include one or more temperature sensors for determining a temperature of the scale apparatus before making weight measurements. A temperature sensor may include a thermal couple sensor, a resistive temperature sensor, a junction type temperature sensor, an infrared temperature sensor, etc. After determining a scale temperature, an offset may be applied to calibration values in order to temperature compensate or calibrate the scale apparatus.

In some embodiments, a top surface 104 of scale apparatus 100 includes haptic bumps which aid a user in positioning himself/herself with respect to the scale. For example, in one embodiment, scale 100 is thin enough to be undetectable without the use of vision. A user with impaired vision uses the bio-electric electrodes 102 and 106 as haptic bumps of scale 100 to position himself/herself on top of scale 100. Alternatively, or additionally, more haptic bumps may be positioned on a surface of scale 100.

In some embodiments, scale 100 includes a printed circuit board (PCB) to which force sensors 108 are adjoined. For example, in one embodiment, scale 100 is manufactured to have a total thickness of 0.05 inches. In this embodiment, scale 108 includes a titanium alloy plating 116 as a top surface, and strain gauges positioned on in cavities on a bottom side of the plating. In another embodiment, scale 100 is manufactured to have a total thickness of 0.035 inches. In this embodiment, the majority of the total thickness is comprised of a PCB which has been patterned with the metals needed to form integrated strain gauges.

In some embodiments, scale 100 and/or force sensors 108 are arranged to compress or contort under a lateral force. Scale 100 and force sensors 108 initially compress under the impact, and during a period of time decompress to leave little to no deformation of scale 108.

Figure 2:
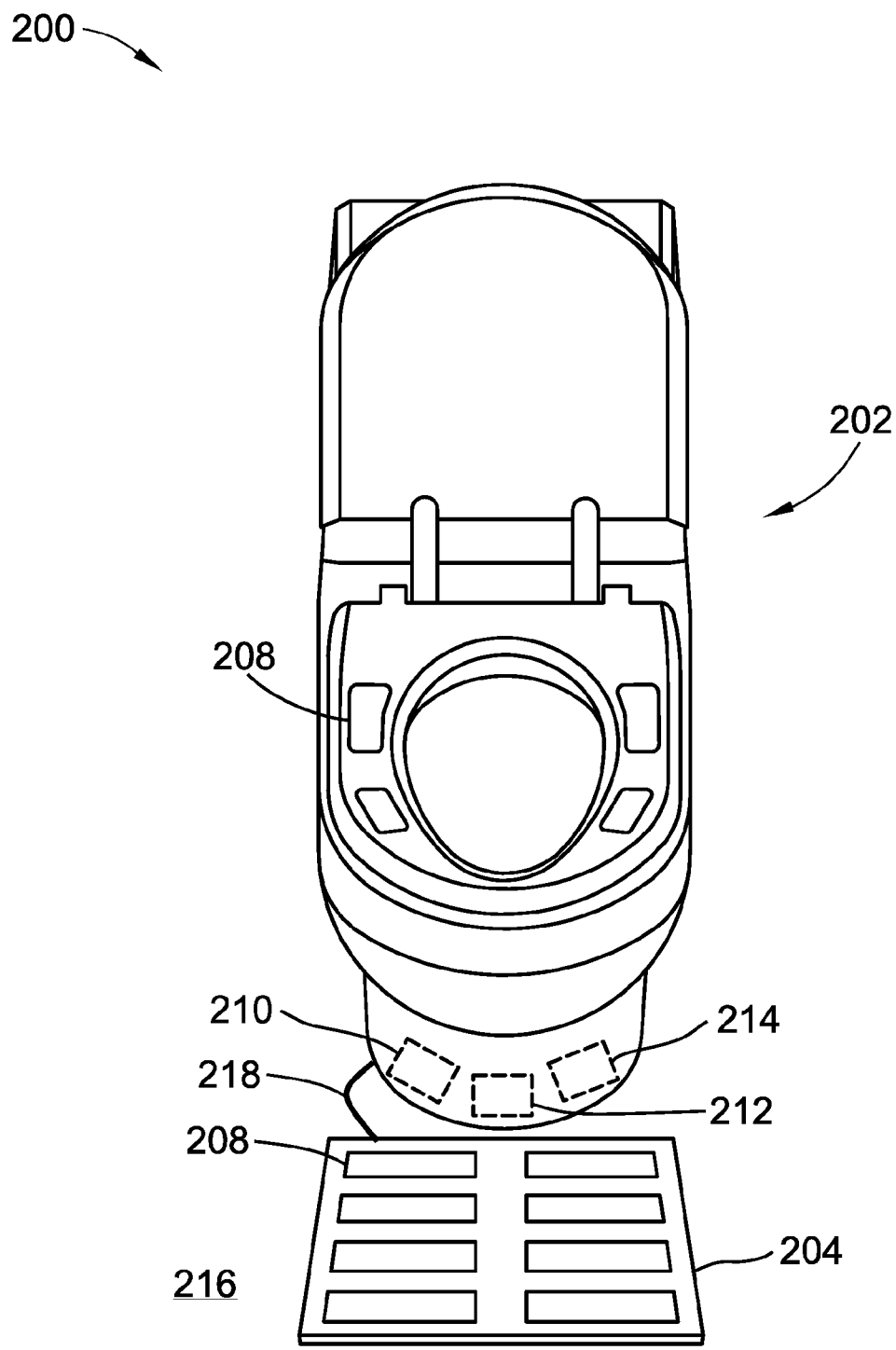
FIG. 2 depicts a toilet and scale apparatus in accordance with an embodiment of the invention.

FIG. 2 depicts a toilet and scale system utilizing bio-impedance electrodes. System 200 includes toilet 202, scale 204, and bio-impedance electrodes 208. As shown, bio-impedance electrodes 208 are positioned on a top surface of scale 204 and on a top surface of the toilet seat of toilet 202. The bio-impedance electrodes may be used to dynamically determine bio-impedance measurements of a user sitting on a toilet. The bio-impedance electrodes may be thin sheets, patches, or strips of conductive metal, conductive spray paint, or electrically conductive silicon. Combinations of bio-impedance measurements may be taken between the electrodes 208 in the toilet seat and the electrodes 208 in the scale. Additionally, system 200 includes one or more processors 210, memory 212, and wireless transceiver 214. Although the depicted embodiment shows toilet 202 including processors 210, memory 212, and wireless transceiver 214, in other embodiments, scale 204 includes processors 210, memory 212, and/or wireless transceiver 214 (as depicted in subsequent Figures). The thin scale 204 may have a single rigid support structure with conductive patches on a top surface of the support material and have 5 or more recesses on a bottom surface of the support material. The five or more recesses may contain force sensors placed within each of the recesses. A total distance or thickness from a bottom surface of the force sensors (touching floor or ground surface 216) to a top surface of the conductive patches 208 may be less than 0.4 inches.

Although the depicted embodiment shows both scale 204 and toilet 202 including bio-impedance electrodes 208, in one embodiment only scale 204 includes bio-impedance electrodes 208. In another embodiment, only toilet 202 includes bio-impedance electrodes 208.

In some embodiments, a top surface of a seat of toilet is partially or completely covered by a compliant member, the compliant member being water resistant or waterproof.

In some embodiments, scale 204 and toilet 202 are coupled electrically by means of a metallic contact or electrical plug 218 in order to transfer information and/or power. Additionally, or alternatively, scale 204 and toilet 202 are coupled wirelessly in order to transfer information.

Figure 3:
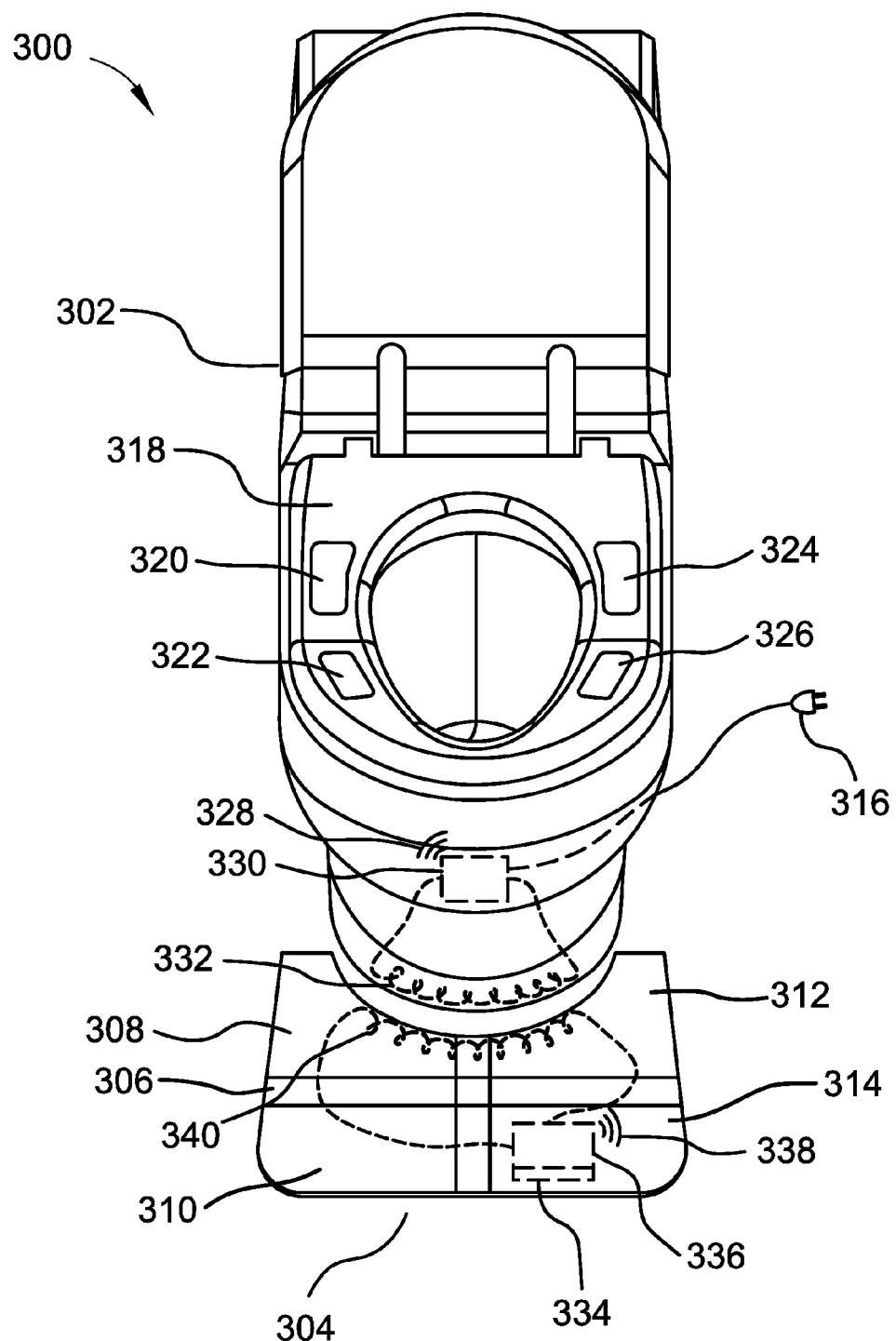
FIG. 3 depicts a toilet and scale apparatus in accordance with an embodiment of the invention.

FIG. 3 depicts a toilet and scale system. System 300 includes toilet 302, scale 304, one or more controllers 330 and/or 336, memory 334, controllers 330 and 336 may include wireless transceivers, memory, programming, and power sources. System 300 may use controllers 330 and/or 336 to store and manipulate weight and bio-impedance information. Bio-impedance information may be collected by controllers 330 and/or 336 using bio-impedance electrodes 308, 310, 312, 314, 320, 322, 324, 326 and/or combinations thereof. Weight and bio-impedance information may then be communicated wirelessly 328, 338 to one or more remote devices. Remote devices may include smart phones, networks, computers, and database servers. For example, in one embodiment a smart phone, a tablet, a smart watch, and/or a personal computer is sent data related to weight and bio-impedance of a user of system 300. In this example, remote devices may store and display weight and bio-impedance information to a user, which information was transferred from scale 304 and/or toilet 302.

A thin substrate material 306 is shown supporting bio-impedance electrodes 308, 310, 312, and 314. A wireless charging inductor 340 is shown positioned to inductively couple with toilet inductor 332. Toilet 302 may receive power 316 from a wall outlet or other power source such as a battery. The toilet power 316 may then be coupled into scale 304 by means of mutual inductance through coils 340 and 332. Alternatively, coils 340 and 332 may form a frequency dependent near-field tuned power source for wirelessly charging and/or powering scale 304. Scale 304 may include 5 or more force sensors beneath the scale and toilet seat 318 may include 2 or more force sensor beneath toilet seat 318. Force sensors under toilet seat 318 and under scale 304 may be used to determine weight of a user individually or collectively.

Magnets (not shown) may be positioned around an adjacent perimeter of scale 304 and toilet 302 with opposite polarities facing each other so as to attract the scale to the toilet allowing for proper positioning and electrical coupling between coils 332 and 340.

Figure 4:
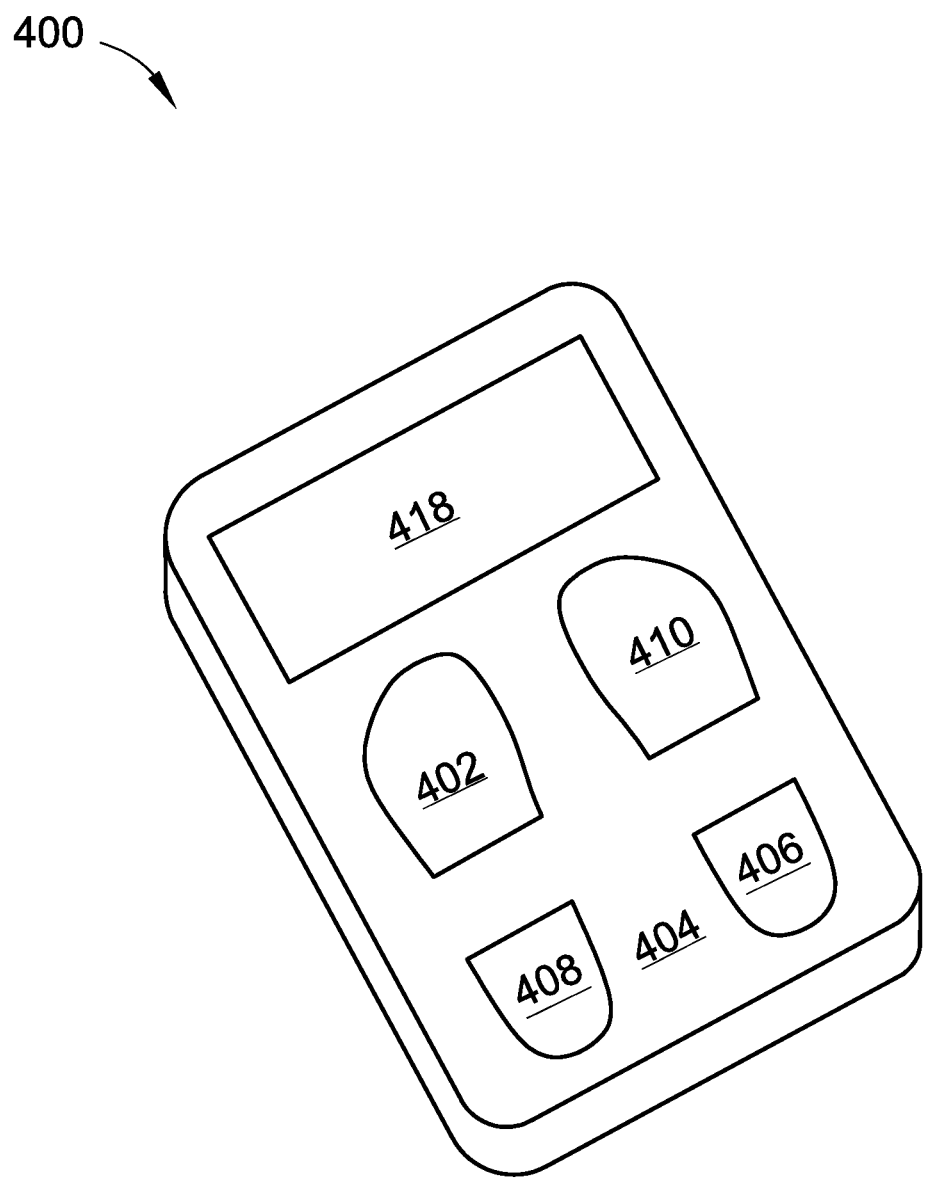
FIG. 4 depicts a scale apparatus in accordance with an embodiment of the invention.

FIG. 4 depicts a scale system. System 400 includes scale 404. Scale 404 includes visual display 418 for displaying data. In some embodiments, display 418 is photo-chromatic. "Photochromatic" is defined as something that changes its color(s) depending on light intensity. For example, in one embodiment, display 418 uses a bright blue light to display information when surroundings are luminous, and display 418 uses a darker red light to display information when the surroundings are less luminous. In some embodiments, photo-chromatic settings including color, shade, and/or no change are set by a user. Bio-impedance electrodes 402, 410, 408, and 406 may be thin sheets, patches, or strips of conductive metal, conductive spray paint, electrically conductive silicon, or a combination thereof. The bio-impedance electrodes 402, 410, 408, and 406 may serve as haptic or visual markers informing a user where to place his or her feet.

Figure 5:
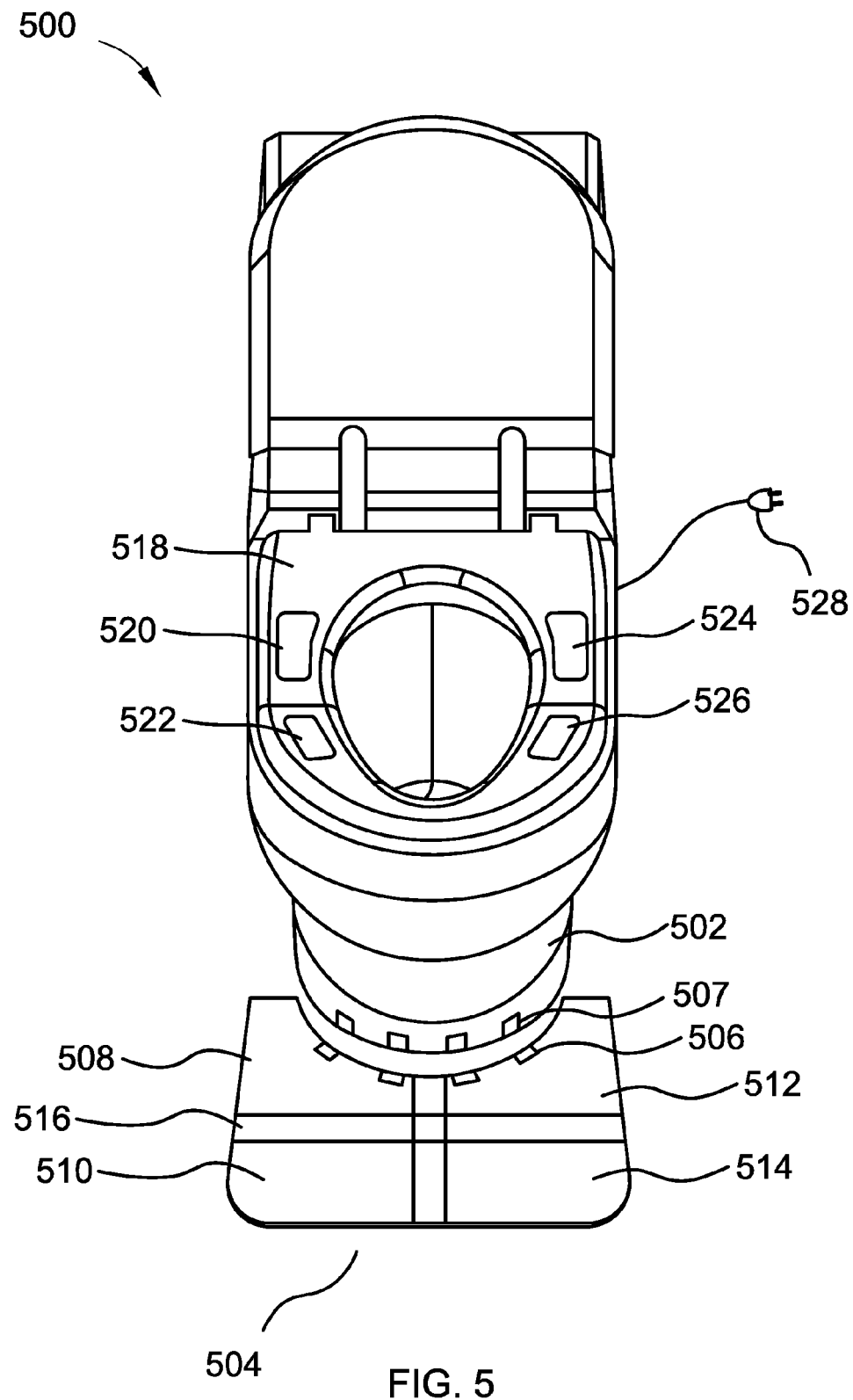
FIG. 5 depicts a toilet and scale apparatus in accordance with an embodiment of the invention.

FIG. 5 depicts a toilet and scale system. System 500 includes toilet 502 and scale 504. Toilet 502 includes power source 528. In some embodiments, power source 528 couples electrically to a wall outlet. In some other embodiments, power source 528 includes batteries. In yet other embodiments, power source 528 couples to an array of solar cells.

Contacts 506 of thin scale 504 may electrically connect to toilet 502 by way of contacts 507. Contacts 506 and 507 may transfer power and data between toilet 502 and thin scale 504. Toilet 502 may contain a controller for reading bio-impedance sensors and force sensors through contacts 507 and 506. In some embodiments scale 504 may not contain a controller or power supply but may rely on a controller and power source within the toilet 502 to read the thin scale sensors. Thin scale 504 may have 5 or more force sensors on a bottom side of the scale (not shown) and have bio-impedance electrodes 508, 510, 512 and 514 on a top side of the thin scale. A total thickness of the scale may be less than 0.4 inches from a highest portion of the top side to a lowest portion of the bottom side touch in a floor or ground. Contacts 506 and 507 may be magnetic contacts which transfer electrical signals and are held together magnetically. Magnets may be positioned around an adjacent perimeter of scale 504 and toilet 502 with opposite polarities facing each other so as to attract the scale to the toilet.

Figure 6:
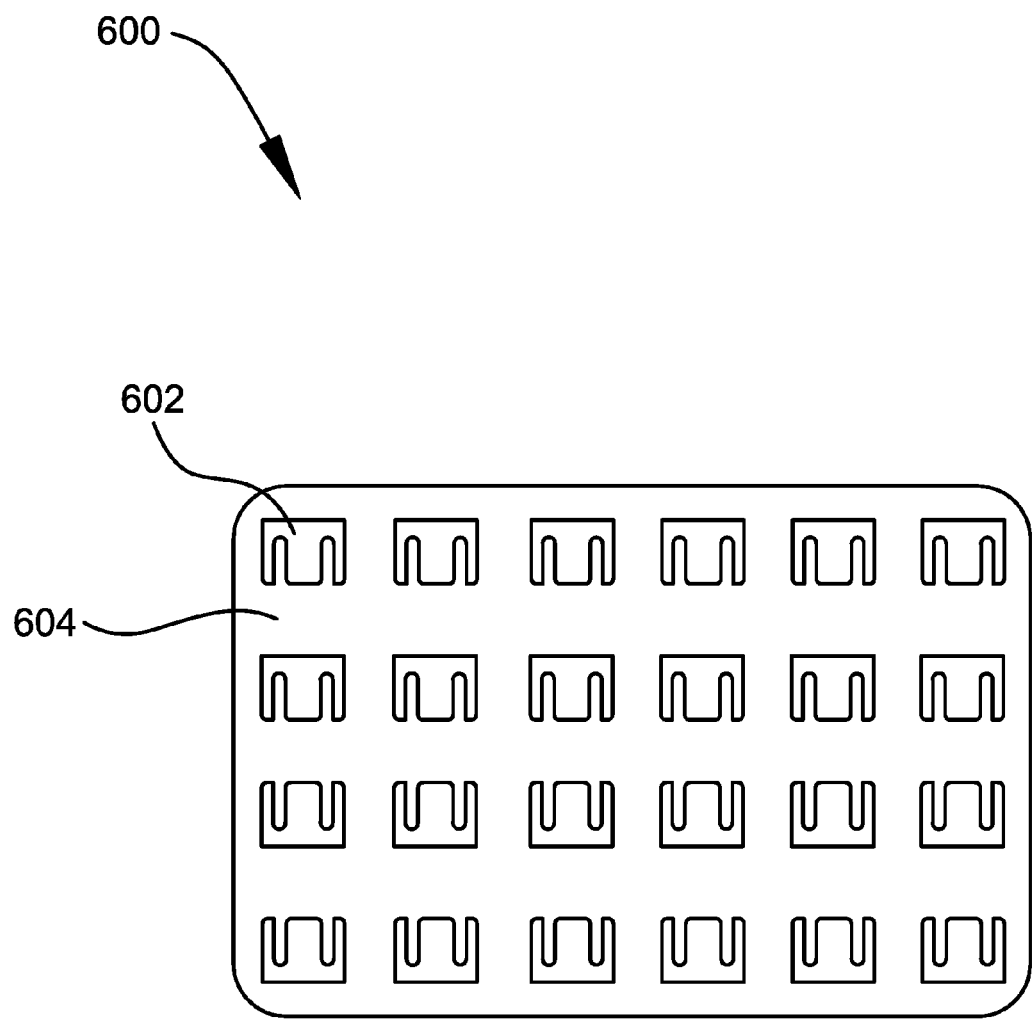
FIG. 6 depicts components of a scale apparatus in accordance with an embodiment of the invention.

FIG. 6 depicts a bottom side of scale apparatus 600. Here we see force sensors 602 patterned on a bottom side of substrate 604. Substrate 604 may be ridged material such as metal, glass, plastic, or a printed circuit substrate. Force sensors 602 may be positioned sufficiently close so as to prevent substrate material 604 from bottoming out when a user steps on thin scale apparatus 600.

Figure 7:
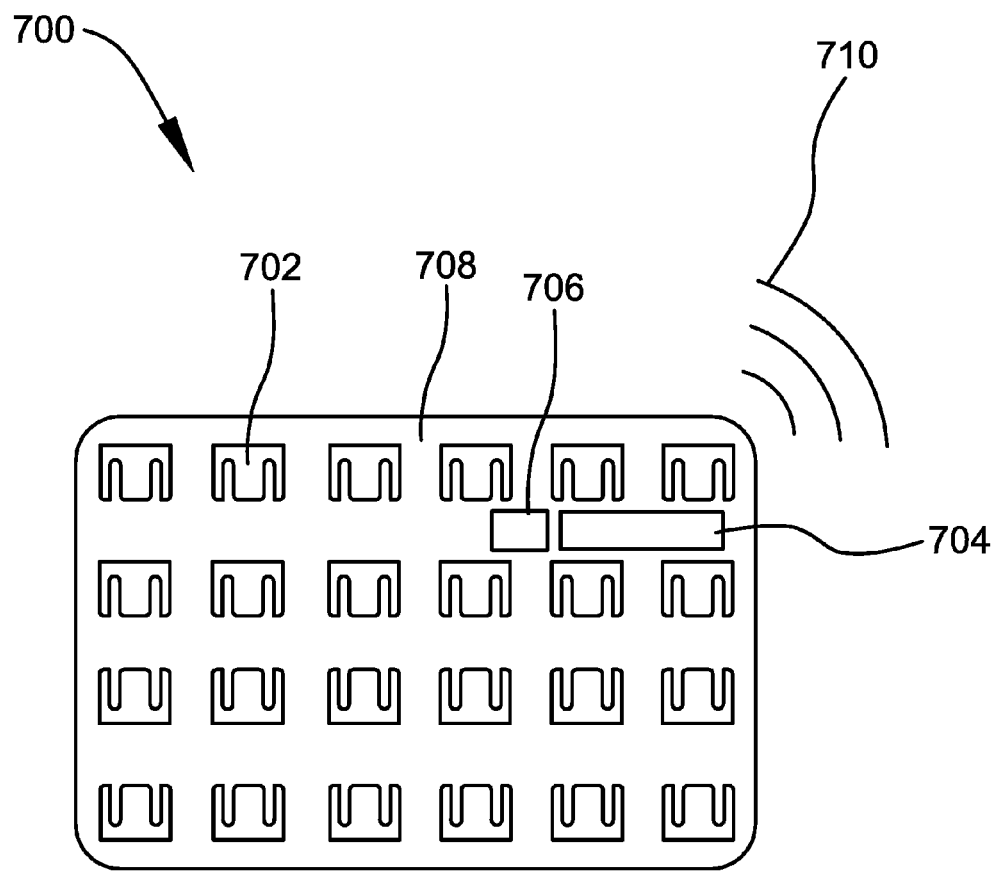
FIG. 7 depicts components of a scale apparatus in accordance with an embodiment of the invention.

FIG. 7 depicts a bottom side of scale apparatus 600. Here we see force sensors 602 patterned on a bottom side of substrate 604. Substrate 604 may be ridged material such as metal, glass, plastic, or a printed circuit substrate. Force sensors 602 may be positioned sufficiently close so as to prevent substrate material 604 from bottoming out against the ground or floor when a user steps on thin scale apparatus 600.

In some embodiments, the concavity of scale 700 includes electrical components 706 and 704, including inductive coils, processors, memory, transceivers, lasers, batteries, etc. In some embodiments, electrical components 706 and 704 may be positioned adjacent to a toilet surface to facilitate powering and data transfer through wires, contacts points, and/or electromagnetic radiation 710.

Figure 8:
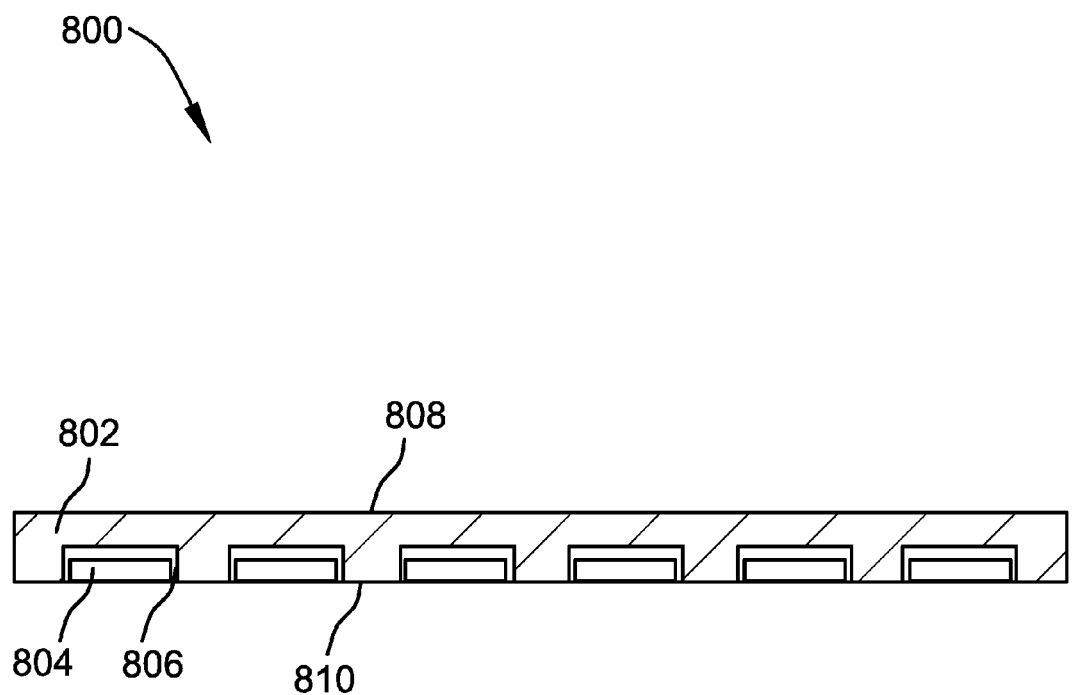
FIG. 8 depicts a scale apparatus in accordance with an embodiment of the invention.

FIG. 8 depicts a side view of thin scale 800. As depicted, scale 800 includes force sensors 804, force cell cavities 806, substrate material 802, a top substrate surface 808, and a bottom substrate surface 810. In this embodiment, the bottom of force sensors 804 is substantially parallel with the bottom substrate surface 810. The top substrate surface 808 may contain a bio-impedance electrode (not shown) or may not have an electrode at all. In a case where no bio-impedance electrode is present, a total distance from the top substrate surface 808 to a bottom substrate surface 810 would be less than 0.4 inches (assuming the force sensors are parallel or embedded within the substrate material).

Figure 9:
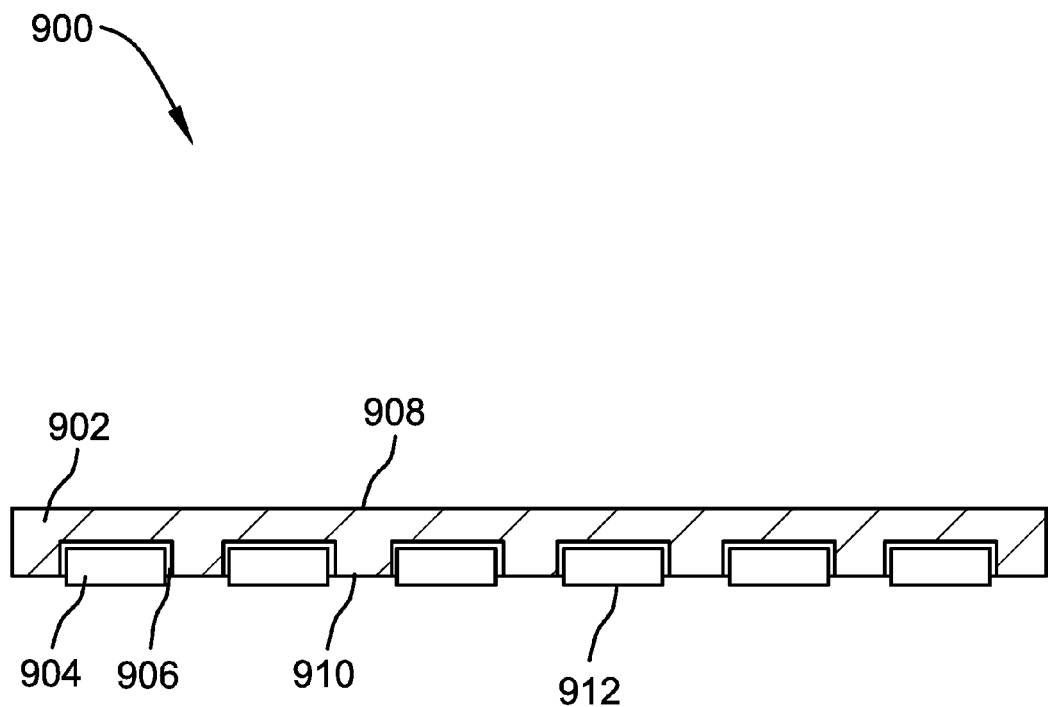
FIG. 9 depicts a scale apparatus in accordance with an embodiment of the invention.

FIG. 9 depicts a side view of thin scale 900. As depicted, scale 900 includes force sensors 904, force cell cavities 906, substrate material 902, a top substrate surface 908, a bottom substrate surface 910, and a bottom surface 912 of the force sensor 904 which touches the ground or floor. In this embodiment, the bottom of force sensors 904 is protrudes from the bottom substrate surface 910. The top substrate surface 808 may contain a bio-impedance electrode (not shown) or may not have an electrode at all. In a case where no bio-impedance electrode is present, a total distance from the top substrate surface 808 to the bottom of force sensors 904 is less than 0.4 inches.

Figure 10:
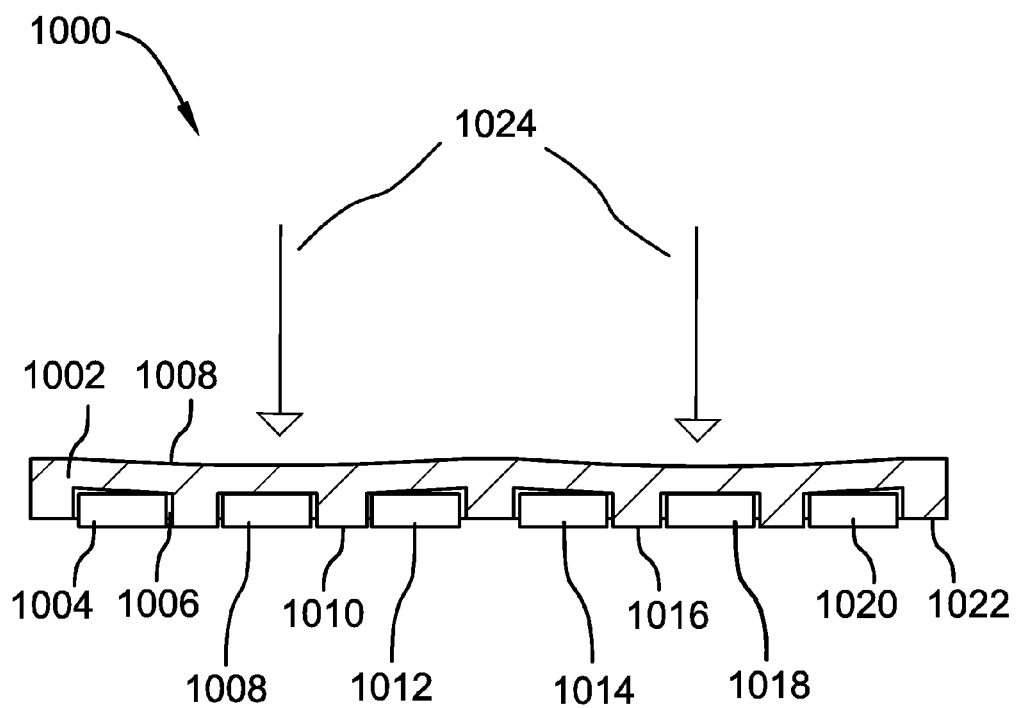
FIG. 10 depicts a scale apparatus in accordance with an embodiment of the invention.

FIG. 10 depicts a side view of thin scale 1000. As depicted, scale 1000 includes force sensors 1004, force cell cavities 1006, substrate material 1002, a top substrate surface 1008, a bottom substrate surface 1010, and a bottom surface of the force sensors 1004, 1008, 1012, 1014, 1018, and 1020 which touch the ground or floor. The number of force sensors may be determined based on a stiffness of the substrate and thickness of the substrate. For instance, a substrate material which will bottom out when force is applied will need to have additional force sensors. If a substrate material is very thin it will displace more under force than a less thin like material. The more a substrate is displaced the more force sensors are required to keep the substrate material from bottoming out. The less displacement of the substrate the fewer force sensors are required to maintain accurate weight measurements. In this embodiment, the bottoms of the force sensors protrude from the bottom substrate surface 1010. The top substrate surface 1008 may contain a bio-impedance electrode (not shown) or may not have an electrode at all. In a case where no bio-impedance electrode is present, a total distance from the top substrate surface 808 to the bottom of the force sensors is less than 0.4 inches. Here we see the result of downward force from a user's weight 1024 upon a top substrate surface 1008. Each of the force sensors 1004, 1008, 1012, 1014, 1018, and 1020 have a different force applied. The total downward force is the sum of all of the force upon each of the force sensors. The total weight of the user can be determined as the force of the sensors is added together.

The invention claimed is:

1. A thin scale apparatus comprising:
   fifty or more force sensors connected to a substrate;
   a highest surface of a top of the thin scale apparatus forming a first plane substantially parallel to a second plane formed by a lowest surface of the thin scale apparatus;
   wherein the first plane and the second plane are separated by a total distance of between 0.4 inches and 0.004 inches and an entirety of the fifty or more force sensors and the substrate are located between the first plane and the second plane; and
   wherein the highest surface is a top surface of a bio-impedance electrode connected to the top of the thin scale apparatus.

2. The thin scale apparatus of claim 1, further comprising a processor, memory, or a wireless transceiver between the first plane and the second plane.

3. The thin scale apparatus of claim 2, wherein the wireless transceiver communicates weight and bio-impedance information with a remote device.

4. The thin scale apparatus of claim 1, wherein the thin scale apparatus further comprises a visual display between the first plane and second planes.

5. The thin scale apparatus of claim 4, wherein the visual display is photo-chromatic.

6. The thin scale apparatus of claim 1, wherein the bio-impedance electrode is also a haptic or visual marker for positioning a user's foot.

7. The thin scale apparatus of claim 1, further comprising an electrical communication with a toilet.

8. The thin scale apparatus of claim 7, wherein the toilet comprises an induction coil coupled to the power source, wherein the induction coil of the toilet is electromagnetically coupled to a coil in the thin scale apparatus.

9. The thin scale apparatus of claim 7, wherein the thin scale apparatus comprises extensions that wrap around a base of the toilet.

10. The thin scale apparatus of claim 7, wherein the thin scale apparatus comprises wires or contacts for electrically connecting to the toilet.

11. The thin scale apparatus of claim 7, wherein one or more magnets hold and position the thin scale apparatus against the toilet.

12. The thin scale apparatus of claim 11, wherein the toilet or the thin scale apparatus comprises one or more metallic contacts positioned at an outer surface to magnetically couple with the one or more magnets.

13. The thin scale apparatus of claim 7, wherein the toilet comprises a wireless transceiver which communicates with a wireless transceiver of the thin scale apparatus.

14. The thin scale apparatus of claim 7, wherein the thin scale apparatus and toilet are coupled electrically by means of a metallic contact in order to charge or power the thin scale apparatus.

15. The thin scale apparatus of claim 7, wherein the toilet comprises force sensors.

16. The thin scale apparatus of claim 1, wherein the bio-impedance electrode is one of thin sheets, patches, or strips of conductive metal, conductive spray paint, or electrically conductive silicon.

17. The thin scale apparatus of claim 1, wherein the thin scale apparatus comprises a heating coil located between the first plane and the second plane.

18. The thin scale apparatus of claim 1, wherein the thin scale apparatus comprises a temperature sensor located between the first plane and second plane.

* * * * *